United States Patent [19]
Pavlath

[11] Patent Number: 5,530,545
[45] Date of Patent: Jun. 25, 1996

[54] METHOD FOR REDUCING RANDOM WALK IN FIBER OPTIC GYROSCOPES

[75] Inventor: George A. Pavlath, Thousand Oaks, Calif.

[73] Assignee: Litton Systems, Inc., Woodland Hills, Calif.

[21] Appl. No.: 283,063

[22] Filed: Jul. 29, 1994

[51] Int. Cl.⁶ .................................................. G01C 19/64
[52] U.S. Cl. ..................................................... 356/350
[58] Field of Search ............................................. 356/350

[56] References Cited

U.S. PATENT DOCUMENTS

| | | | |
|---|---|---|---|
| 4,765,739 | 8/1988 | Koizumi et al. | 356/350 |
| 5,116,127 | 5/1992 | Gröllmann | 356/350 |
| 5,123,741 | 6/1992 | Spahlinger | 356/350 |
| 5,133,600 | 7/1992 | Schröder | 356/350 |
| 5,137,359 | 8/1992 | Steele | 356/350 |
| 5,189,488 | 2/1993 | Mark et al. | 356/350 |
| 5,214,488 | 5/1993 | Büschelberger et al. | 356/350 |
| 5,268,740 | 12/1993 | Gröllmann | 356/350 |
| 5,337,143 | 8/1994 | Mark et al. | 356/350 |

OTHER PUBLICATIONS

W. K. Burns, R. P. Moeller, A. Dandridge, "Excess Noise in Fiber Gyroscope Sources," IEEE Photonics Technology Letters, vol. 2, No. 8 (Aug. 1990).

*Primary Examiner*—Vincent P. McGraw
*Attorney, Agent, or Firm*—Elliott N. Kramsky

[57] ABSTRACT

A method for modulating a fiber optic gyroscope achieves a reduction in output noise beyond that possible through increased peak power with conventional phase modulation. A periodic modulation waveform is applied to an electro-optic modulator, such as an MIOC, to induce a periodic phase shift $\phi_M(t)$ where the form of the periodic phase shift is chosen such that the gyro random walk is below that associated with maximum output signal modulation.

26 Claims, 5 Drawing Sheets

METHOD FOR REDUCING RANDOM WALK IN FIBER OPTIC GYROSCOPES

BACKGROUND

1. Field of the Invention

The present invention relates to fiber optic gyroscopes. More particularly, this invention pertains to apparatus and a method for lowering random walk error in the output of a fiber optic gyroscope.

2. Description of the Prior Art

The Sagnac interferometer is an instrument for determining rotation by measurement of a nonreciprocal phase difference generated between a pair of counterpropagating light beams. It generally comprises a light source such as a laser, an optical waveguide consisting of several mirrors or a plurality of turns of optical fiber, a beamsplitter-combiner, a detector and a signal processor.

In an interferometer, the waves coming out of the beamsplitter counterpropagate along a single optical path. The waveguide is "reciprocal". That is, any distortion of the optical path affects the counterpropagating beams similarly, although the counterpropagating beams will not necessarily experience such perturbations at the same time or in the same direction. Time-varying perturbations may be observed where the time interval is equal to the propagation time of the light around the optical waveguide whereas "nonreciprocal" perturbations affect the counterpropagating beams differently and according to the direction of propagation. Such nonreciprocal perturbations are occasioned by physical effects that disrupt the symmetry of the optical medium through which the two beams propagate.

Two of the nonreciprocal effects are quite well known. The Faraday, or collinear magneto-optic effect, occurs when a magnetic field creates a preferential spin orientation of the electrons in an optical material whereas the Sagnac, or inertial relativistic effect, occurs when rotation of the interferometer with respect to an inertial frame breaks the symmetry of propagation time. The latter effect is employed as the principle of operation of the ring gyroscope.

The measured or detected output of a gyroscope is a "combined" beam (i.e., a composite beam formed of the two counterpropagating beams) after one complete traverse of the gyroscope loop. The rotation rate about the sensitive axis is proportional to the phase shift that occurs between the couterpropagating beams. Accordingly, accurate phase shift measurement is essential.

Figure 1:
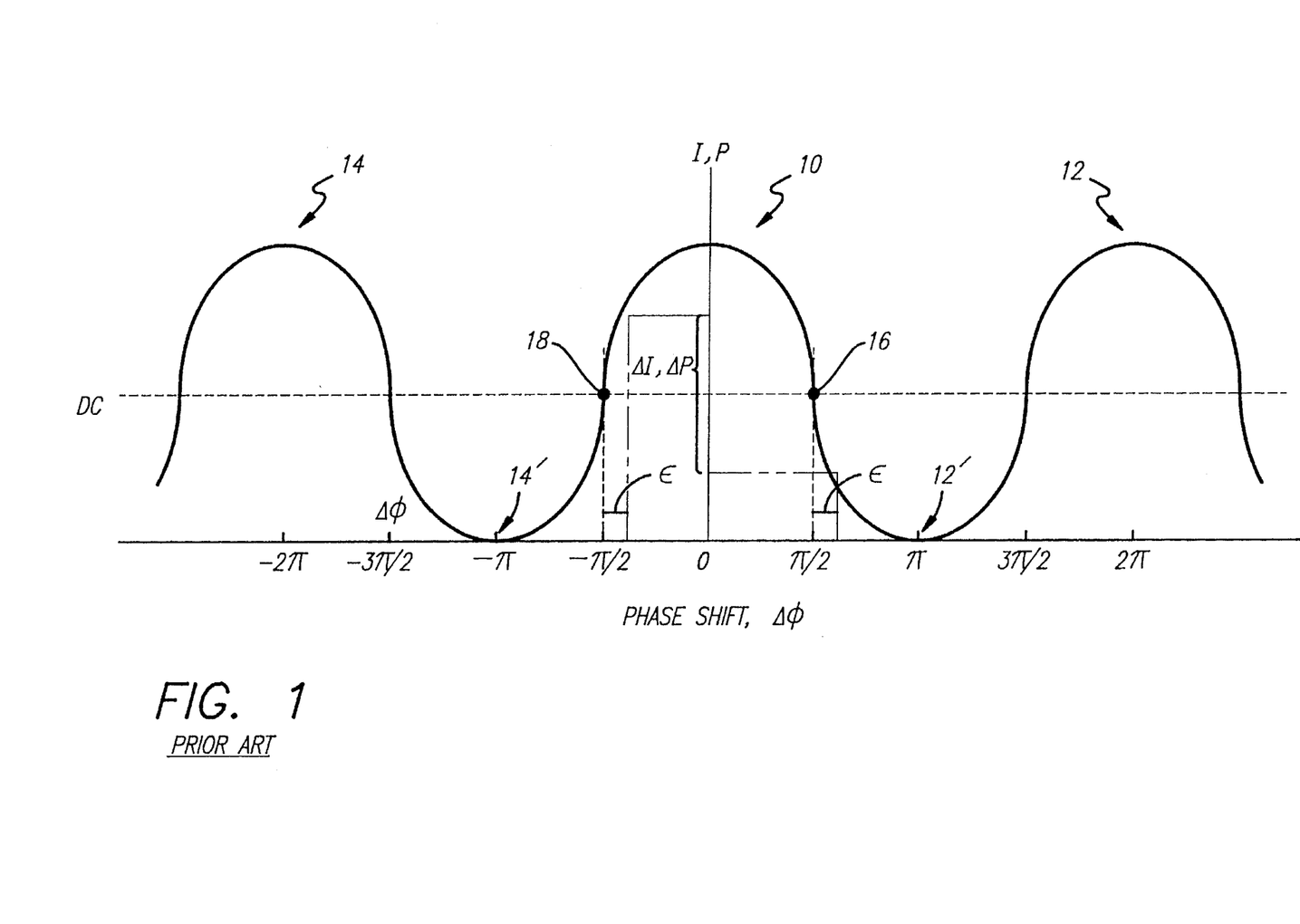
FIG. 1 is a graph of the intensity or power of the output of a fiber output gyroscope as a function of the phase shift between the counterpropagating component beams with the effect of square wave modulation in accordance with the prior art indicated thereon.

FIG. 1 is a graph of the well known relationship between the intensity (or power, a function of the square of the electric field) of the detected beam output from the coil of optical fiber and the phase difference that exists between the two counterpropagating beams after completion of a loop transit. (Note: Typically, prior art photodetectors are arranged to measure output power rather than intensity.) The figure discloses a fringe pattern that is proportional to the cosine of the phase difference, $\Delta\phi$, between the beams. Such phase difference provides a measure of the nonreciprocal perturbation due, for example, to rotation. A DC level is indicated on FIG. 1. Such DC level corresponds either to the half (average) intensity level or the half power level of the gyro output.

It is a well known consequence of the shape of the fringe pattern, that, when a small phase difference, or a small phase difference $\pm n\pi$ where n is an integer, is detected (corresponding to a relatively low rotation rate), the intensity of the output beam will be relatively insensitive to phase deviation or error as the measured phase difference will be located in the region of a maximum or minimum of the output fringe pattern. This phenomenon is illustrated at regions 10, 12, 12', 14 and 14' of the fringe pattern which correspond to phase shifts in the regions of $\phi=0$, $+2\pi$, $+\pi$, $-2\pi$ and $-\pi$ radians respectively. Further, mere intensity does not provide an indication of the sense or direction of the rotation rate.

For the foregoing reasons, an artificially biased phase difference is commonly superimposed upon each of the counterpropagating beams, periodically retarding one and advancing the other in phase as the pair propagates through the sensor coil. The biasing of the phase shift, also known as "nonreciprocal null-shift", enhances the sensitivity of the intensity measurement to phase difference by shifting the operating point to a region characterized by greater sensitivity to a phase deviation $\epsilon$ indicative of the presence of rotation. In this way, the variation in light intensity observed at the photodetector, $\Delta I$ (or power $\Delta P$), is enhanced for a given nonreciprocal phase perturbation $\epsilon$.

By enhancing the intensity effect due to the presence of a given phase perturbation $\epsilon$, corresponding increases in photodetector output sensitivity and accuracy are obtained. These, in turn, may be translated into a simplification and resulting economization of the output electronics. Such output electronics commonly includes a differencing circuit for comparing the intensity values of the operating points between which the electro-optic modulator (often a multifunction integrated optical chip or "MIOC") is cycled during a loop transit time $\tau$.

Figure 2:
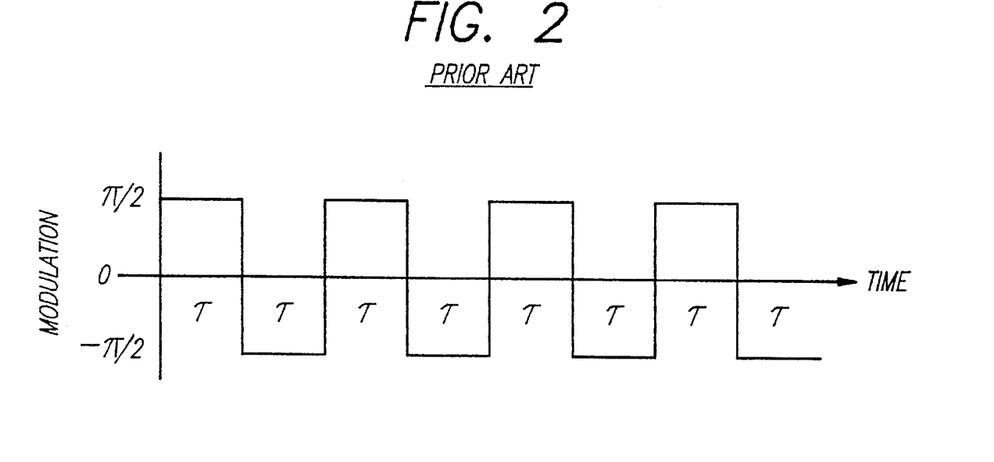
FIG. 2 is a graph of a representative modulation waveform (square wave) for a fiber optic gyroscope in accordance with the prior art.

Presently, fiber optic gyroscopes are commonly biased by a periodic modulation waveform, often either a square wave or a sinusoid. The square wave is cycled between $\pm\pi/2$ with a period of $2\pi$ while the sinusoid is cycled between maxima and minima of approximately $\pm 1.8$ radians. The sinusoidal extremes correspond to the argument of the maximum of the first order Bessel function of the first kind, $J_1(x)$. The prior art square wave modulating waveform is illustrated in FIG. 2.

Referring back to FIG. 1, the representative square wave modulation profile of the prior art square wave modulation corresponds to alternation of the output intensity curve between the operating points 16 and 18. Each of the points 16 and 18 lies at an inflection of the intensity fringe pattern where a small nonreciprocal perturbation $\epsilon$ of the phase difference $\Delta\phi$ results in a maximum detectable change, $\Delta I$ ($\Delta P$), in the optical intensity (power) output. Also, by alternating the bias imposed between two different operating points, the system can determine the sign of $\epsilon$ and, thus, the direction of rotation.

In addition to phase modulation, "phase-nulling" is commonly applied to the interferometer output. This introduces an additional phase shift through a negative feedback mechanism to compensate for that due to the nonreciprocal (Sagnac) effect. A phase ramp (either analog or digital) with slope proportional to the rate of change of the measured phase difference is commonly generated for this purpose. Commonly, a ramp, varying in height between 0 and $2\pi$ radians, provides the nulling phase shift since the required shift cannot be increased indefinitely due to voltage constraints.

One of the primary uses of inertial systems is to determine aircraft heading. Such a determination depends upon the quality of the system sensors, including the gyros, and is affected by the amount and type of noise in the gyro outputs.

The noise properties of the outputs of advanced technology gyros (e.g., those of the laser and fiber optic type) include a so-called "random walk" characteristic. This represents a stochastic process in which each step constitutes a statistically independent event. When measuring a variable subject to random walk, such as the output of a fiber optic gyroscope, a gradual convergence to a so-called "true" measurement takes place. For example, in measuring the drift rate of heading angle with a fiber optic gyroscope known to possess a true drift rate of 0 degrees per hour, one might expect to obtain a rate measurement of 0.9 degrees per hour over a 100 second time slice and a measurement of 0.3 degrees per hour over a 900 second time slice. It is a characteristic of random walk that the uncertainty of an estimate diminishes as its length (number of samples) is increased.

Random walk can include a random, non-convergent stochastic process known as white noise (i.e., noise whose power spectral density (PSD) is "flat"). The presence of white noise is particularly troublesome when one employs a gyroscope to determine heading angle. When a noise component of gyro output is truly white noise random, the RMS value of the angle will grow with the square root of time. That is, $$\sigma = RW \sqrt{T} \quad (1)$$

where:
RW=random walk coefficient;
T=time; and
σ=standard deviation of the heading angle.

The above equation indicates that the random walk error due to white noise will cause the heading angle to grow over time. This, of course, is quite troublesome.

Figure 3:
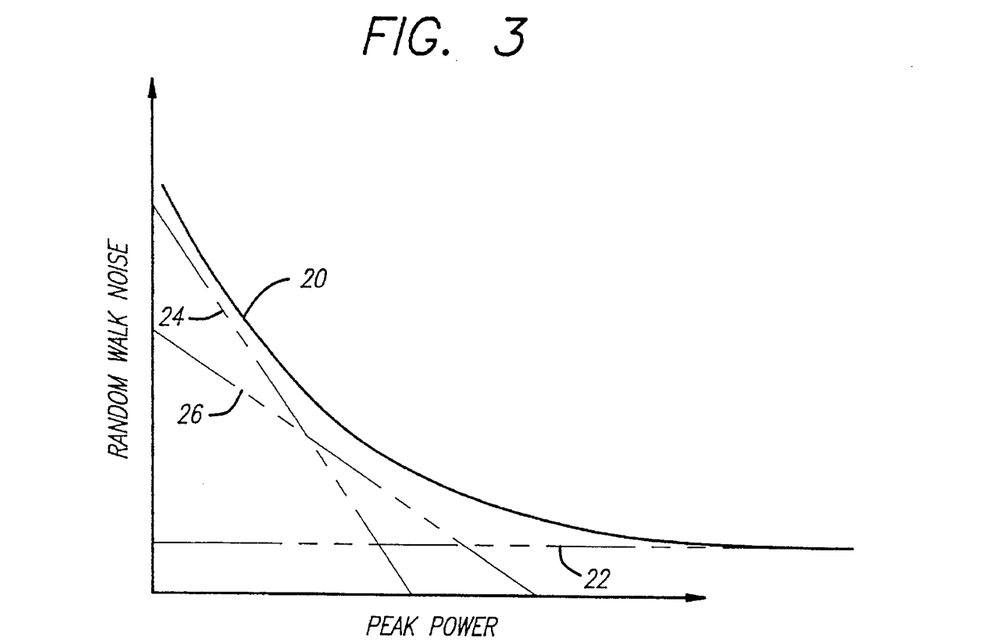
FIG. 3 is a graph of the relationship(s) between the random noise components of the output of a fiber optic gyro and peak power of the light source.

FIG. 3 is a graph (not to scale) that illustrates the relationship that exists between random walk (curve 20) and light source peak power in a fiber optic gyroscope. White noise in the output of a fiber optic gyro can have a number of sources. Electronics noise (both dark current and Johnson or thermal noise), shot noise and beat, or synonymously relative intensity noise, may all contribute. The contributions of electronic noise and shot noise to gyro random walk decrease as the peak power is increased, a phenomenon shown generally in FIG. 3. As may also be seen in that figure, the contribution of synonymously relative intensity noise (curve 22) is independent of peak power and thereby limits the extent to which gyro random walk can be reduced through an increase. In contrast within a predetermined range, increases, in peak power will reduce the contributions of electronics noise (curve 24) and shot noise (curve 26). Beyond such range, increased power will not lead to better random walk performance.

The relative importance of white noise increases with the power of the light source. Superluminescent diodes provide about 0.5 milliwatts of peak power whereas rare earth doped sources are commonly rated in the vicinity of 10 milliwatts. Referring to FIG. 3, the contribution of white noise to random walk is a fraction of that of shot noise which, in turn, is a fraction of that of electronics noise when a low power source, such as a superluminescent diode, is employed. As the power of the light source is increased, the contribution of synonymously relative intensity noise eventually dominates the noise performance of the gyroscope.

A prior art attempt to isolate and remove the effect of white noise from gyro output has involved "tapping" the output of the light source, then differencing such output with that of the gyro. This relies upon the fact that synomously relative intensity noise originates with the light source. The mechanization of such a scheme is complex and fraught with technical difficulties involving synchronization of detected outputs and matching and stabilization of gains with time and temperature as well as a second detector requirement. In addition to the obvious costs, including power, incurred, the size of the gyro is necessarily increased, rendering such approach of limited feasibility.

SUMMARY OF THE INVENTION

The present invention addresses the preceding and other shortcomings of the prior art by providing, in a first aspect, an improvement in the method for modulating a fiber optic gyroscope of the type that includes the sensor coil of optical fiber. In such a gyroscope, the output of a light source is directed into the coil, then split into a pair of beams. The beams are input into opposed ends of the coil to counterpropagate and are then combined to form a gyroscope output.

The improvement provided by the invention is begun by selecting a periodic artificial phase shift such that the random walk of the output is less than that of maximum output signal modulation. Such a periodic artificial phase shift is then applied between the counterpropagating beams.

A second aspect of the invention provides a method for modulating a fiber optic gyroscope of the type that includes a sensor coil of optical fiber. Such method is begun by directing the output of a light source into the gyroscope. The light source output is then split into a pair of beams and such beams are input into opposite ends of the coil to counterpropagate. A periodic artificial phase shift in the form of a square wave $\phi_M(t)$ is applied between the counterpropagating beams. Such periodic artificial phase shift is of the form $(4n+1)\pi/2<|\phi_M(t)|<(2n+1)\pi$ where n is an integer and includes 0. The counterpropagating beams are then combined to form a gyroscope output.

In a third aspect, the method described in the preceding paragraph is modified insofar as the square wave $\phi_M(t)$ for applying a periodic artificial phase shift between the counterpropagating beams is of the form $(2n+1)\pi<|\phi_M(t)|<(4n+3)\pi/2$ where n is an integer and includes 0.

In a fourth aspect, the invention provides a method for modulating a fiber optic gyroscope of the type that includes a sensor coil of optical fiber. In such aspect, the output of a light source is directed into the gyroscope. The light source output is then split into a pair of beams which are input into opposite ends of the coil to counterpropagate therein.

A periodic artificial phase shift is applied between the counterpropagating beams. Such phase shift comprises a sinusoid $\phi_M(t)$ where $x<|\phi_M(t)|<y$, x being such that $J_1(x)$ is a maximum, $J_1(y)=0$ and $J_1(\ )$ being a first order Bessel function of the first kind. The counterpropagating beams are then combined to form a gyroscope output.

A fifth aspect of the invention provides a method for adjusting random walk noise in the output of a fiber optic gyroscope of the type in which a pair of light beams counterpropagates within a sensor coil of optical fiber. Such method is begun by applying a periodic artificial phase shift between the counterpropagating beams and varying the magnitude of the periodic artificial phase shift to responsively adjust random walk noise.

The foregoing and other features and advantages of the present invention will become further apparent from the detailed description that follows. Such description is accompanied by a set of drawing figures. Numerals of the drawing figures, corresponding to those of the written text, refer to features of the invention. Like numerals refer to like features throughout both the written description and drawing figures.

DETAILED DESCRIPTION OF THE PREFERRED EMBODIMENT

The present invention overcomes limits to possible noise reduction in the output of a fiber optic gyroscope subject to random walk error and including a white noise component. Referring back to FIG. 3, random walk noise is subject to reduction through increased light source peak power. However, a limiting value is approached as power is increased. The presence of such a limiting value can be especially troublesome when measuring heading angle over a protracted period of time due to the proportionality between heading error and time in the presence of white noise.

Superluminescent diodes have commonly been employed as light sources. However, higher power light sources of the rare earth doped fiber type may generate power in the region of ten (10) milliwatts, far in excess of that provided by a superluminescent diode. FIG. 3 demonstrates that, as the power of the light source is increased, the relative contribution of a factor, synonymously relative intensity noise, insensitive to peak power, becomes the dominant contributor to output noise.

The inventor has addressed the problem of a "floor" to noise reduction in gyroscope output by providing modulation schemes that produce output signals characterized by random walk that is less than is possible when modulation schemes of the prior art type, such as the square wave modulation of FIG. 2, are employed. Further, the modulation schemes of the invention address problems that become more prominent as the power of the light source is increased. Thus, while some degree of output sensitivity to nonreciprocal phase perturbations $\epsilon$, is sacrificed, increased light source power compensates to generate adequate signal output for data processing purposes.

I. Analysis of Square Wave Modulation

As mentioned earlier, random walk in the output of a fiber optic gyro is limited by white noise having a flat PSD. The sources of white noise in fiber optic gyros include electronics noise, shot noise and beat noise or synonomously relative intensity noise. The random walk due to each of such noise sources for a gyro modulated in accordance with FIG. 2, for example, is as follows:

$$RW_{elect} = \frac{1}{K_{SSF}} \frac{\sqrt{2} \, NEP}{P_o} \quad (2a)$$

$$RW_{shot} = K_{SSF} \sqrt{\frac{2e}{RP_o}} \quad (2b)$$

$$RW_{RIN} = RIN/[K_{SSF} \sqrt{2}] \quad (2c)$$

$$RW_{RSS} = \sqrt{RW_{elex}^2 + RW_{shot}^2 + RW_{RIN}^2} \quad (2d)$$

where $K_{SSF}$ is the Sagnac Scale Factor of the fiber gyro, NEP is the noise equivalent power in units of Watts/√Hz for the photodetector, $\epsilon$ is the charge of an electron, R is the photodetector responsivity in units of amps/Watt, RIN is the relative intensity noise coefficient of the light source in units of 1/Hz and $P_o$ is the peak power of the gyro light source.

The Sagnac scale factor, $K_{SSF}$, is defined as:

$$K_{SSF} = \frac{2\pi LD}{\lambda c} \quad (3)$$

where L is the fiber length, D is the fiber diameter, $\lambda$ is the mean wavelength of light in the fiber gyro and c is the free space velocity of light. The detected power of the fiber gyro is:

$$P = P_o(1 + \cos(K_{SSF}\Omega + \phi_M(t)))/2 \quad (4)$$

where $\Omega$ is the rotation rate to be measured and $\phi_M(t)$ is a periodic modulation function. Referring to FIG. 2, $\phi_M(t)$ is chosen to be a square wave of period $2\tau$ and amplitude $\pi/2$ although a sinusoidal waveform of amplitude varying between maxima of approximately ±1.8 radians and having period of $2\tau$ (where 1.8 radians is the argument x of $J_1(x)_{max}$ where $J_1(x)$ is a first order Bessel function of the first kind) represents the equivalent prior art sinusoidal modulation scheme. As mentioned earlier, $\tau$ is the transit time of light through a fiber coil of length L. To accommodate the modulation function as shown in FIG. 2 (i.e. square wave of amplitude ±π/2), demodulation may be accomplished via wideband A/D conversion followed by digital subtraction.

Referring to equations 2a through 2d in combination with the graph of FIG. 3, it may be noted that $RW_{elect}$ and $RW_{shot}$ is each inversely proportional to $P_o$ while the value of $RW_{RIN}$, the remaining component of $RW_{RSS}$, is independent of $P_o$. Accordingly, it is the contribution due to synonymously relative intensity noise that is the source of true white noise in the output of a fiber optic gyro. This noise component of gyro random walk limits the noise reduction that can be achieved through higher power operation.

The inventor has addressed the preceding noise limitation with a modulation scheme that reduces the effect of relative intensity noise. In this way the noise performance of the output of the gyro overcomes the limitations that are present when a "conventional" periodic modulation waveform, such as the square wave illustrated in FIG. 2 or the corresponding sinusoidal prior art modulation waveform, is applied.

It is well known that the general equations for random walk due to electronic noise, shot noise and beat noise in a gyro subject to square wave modulation of arbitrary amplitude are as follows:

$$RW_{elex} = \frac{1}{K_{SSF}} \frac{\sqrt{2} \, NEP}{P_o} \frac{1}{\sin \phi_M} \quad (5a)$$

$$RW_{shot} = \frac{1}{K_{SSF}} \sqrt{\frac{2e}{RP_o}} \frac{\sqrt{1 + \cos \phi_M}}{\sin \phi_M} \quad (5b)$$

$$RW_{RIN} = \frac{1}{K_{SSF}} \frac{RIN}{\sqrt{2}} \frac{1 + \cos \phi_1 M}{\sin \phi_M} \quad (5c)$$

As before, $$RW_{RSS} = \sqrt{RW_{elex}^2 + RW_{shot}^2 + RW_{RIN}^2} \quad (5d)$$

The above expressions differ from those of equations 2a through 2d by the inclusion of terms that drop out when $\phi_M$ is set to $\pi/2$. (Corresponding expressions, well known to those skilled in the art, describe gyro output noise subject to sinusoidal modulation of arbitrary amplitude $\phi_M$.) By referring to equations 5a through 5c, the inventor has found that the "limiting" random walk coefficient $RW_{RIN}$ may be reduced below that given by equation 2c when the amplitude of the square wave modulation is changed from $\pm\pi/2$, representative of maximum signal modulation of the prior art, to a function $\phi_M(t)$ defined as follows:

$$(4n+1)\pi/2 < |\phi_M(t)| < (2n+1)\pi \quad (6a)$$

$$(2n+1)\pi < |\phi_M(t)| < (4n+3)\pi/2 \quad (6b)$$

where n is an integer including 0.

The inventor has found a corresponding improvement in output random walk in the presence of sinusoidal modulation $\phi_M(t)$ when such modulation is changed from a sinusoid alternating between maxima and minima of approximately $\pm 1.8$ radians to one having maxima and minima within a range defined as follows:

$$x < |\phi_M(t)| < y \quad (6c)$$

where x is such that $J_1(x)$ is a maximum, $J_1(y) = 0$ and $J_1()$ is a first order Bessel function of the first kind.

Figure 4:
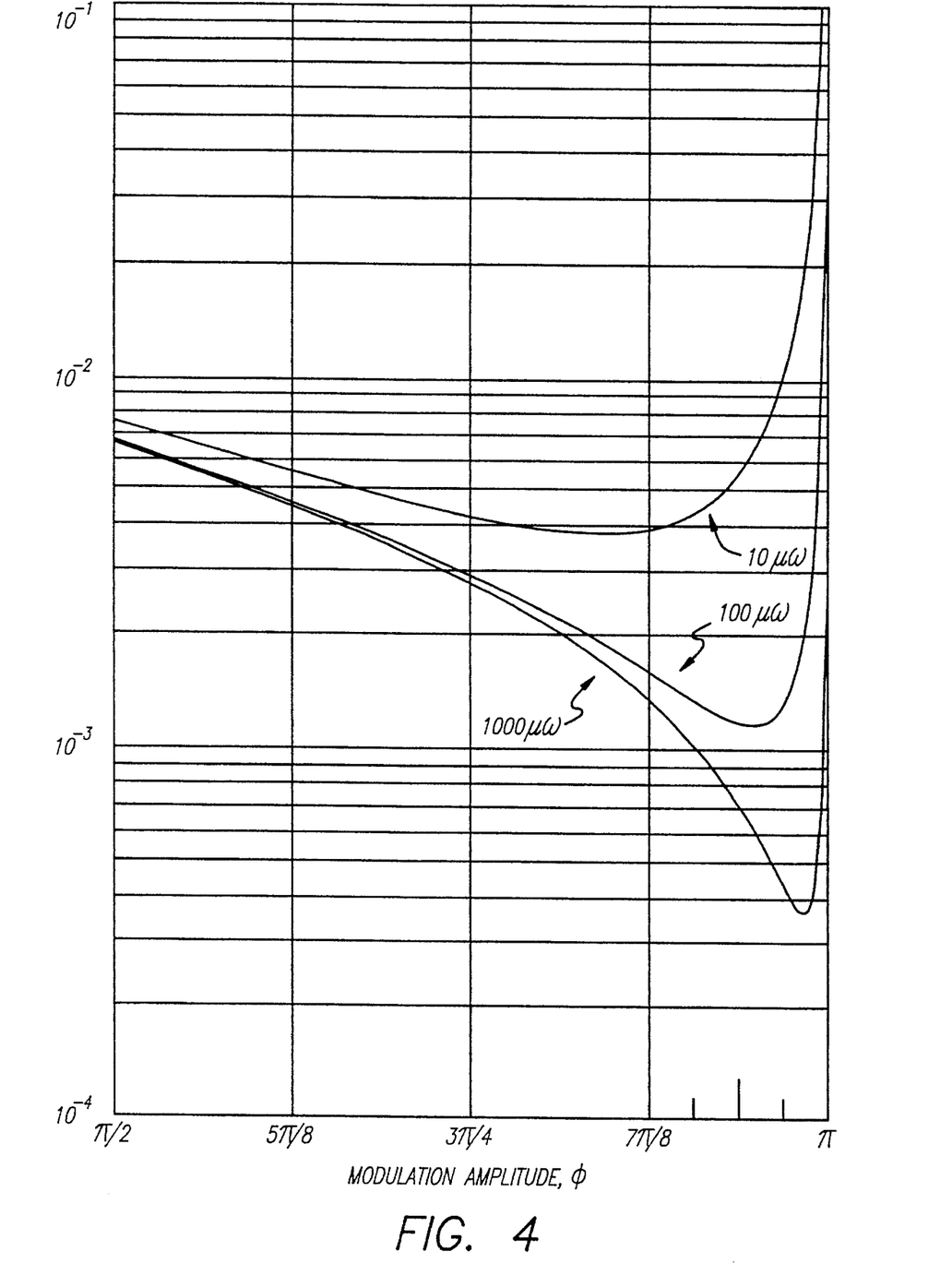
FIG. 4 is a graph of gyroscope output random walk as a function of modulation amplitude.

The improvement in gyro random walk made possible by modulation in accordance with the invention is confirmed by the graph of FIG. 4 which presents a plot of random walk (logarithmic scale) versus square wave modulation amplitude $\phi_M$. Three curves are presented, each corresponding to a different peak power level. One curve presents a plot of the variables at a peak power of 10 milliwatts, another plots the variables for a peak power of 100 milliwatts, and the third curve plots the variables for a peak power level of 1000 milliwatts. As can be seen, gyro random walk decreases with increasing peak power. (Note: the left- most values of the graph indicate prior art ($\pm\pi/2$) square wave modulation.)

Comparing the graphs of FIGS. 2 and 4, one can see that a dramatic reduction of random walk is obtained as the square wave modulation amplitude $\phi_M$ is increased beyond $\pi/2$ (the same result would be observed below $-\pi/2$). As shown in FIG. 4, the random walk is limited to approximately 0.007 degree/$\sqrt{\text{hour}}$ for all power levels at $\pi/2$ square wave modulation amplitude. This value essentially represents the relative intensity noise term $RW_{RIN}$ of equation 2c. A greater than ten-fold reduction is obtained when the modulation amplitude $\phi_M$ is increased to approximately $31\pi/32$ in a 1000 microwatt peak power gyro. Thereafter, the random walk of the gyro output increases substantially in the region of $\pi$ radians, reflecting the relative insensitivity of output intensity to deviations in phase difference in the region of a $\pi$ (or $n\pi$ where n is an integer) phase difference.

Table I below lists the random walk that can be obtained with prior art (i.e. $\pm\pi/2$ square wave modulation amplitude) operation along with an optimum modulation amplitude and the random walk value achieved using such optimum modulation in accordance with the invention. Further, an improvement factor is indicated representing the reduction in white noise accomplished when modulation in accordance with the invention is employed.

TABLE I

| Peak Power (microwatts) | Random Walk, Prior Art (deg/$\sqrt{\text{hr}}$) | Opt. Mod. Amplitude, $\phi_{opt}$ (rad) | Random Walk at $\phi_{opt}$ (deg/$\sqrt{\text{hr}}$) | Improve Factor |
|---|---|---|---|---|
| 10 | 0.008 | 2.6 | 0.004 | 2× |
| 100 | 0.007 | 3.0 | 0.001 | 7× |
| 1000 | 0.007 | 3.1 | 0.0004 | 17.5× |

Figure 5A:
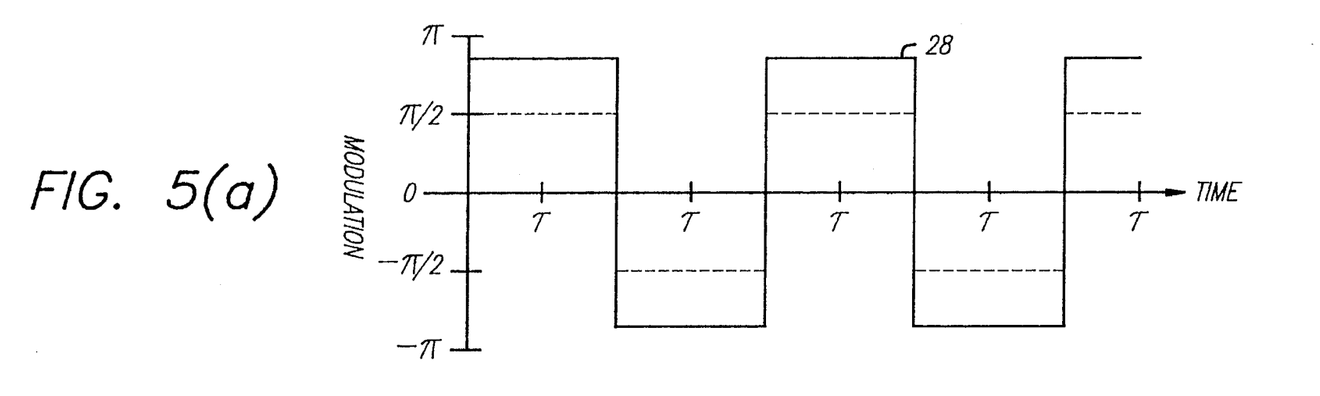
FIGS. 5(a) and 5(b) are graphs of a modulation waveform in accordance with the method of the invention and the output of a fiber optic gyroscope subject to such modulation, respectively.
Figure 5B:
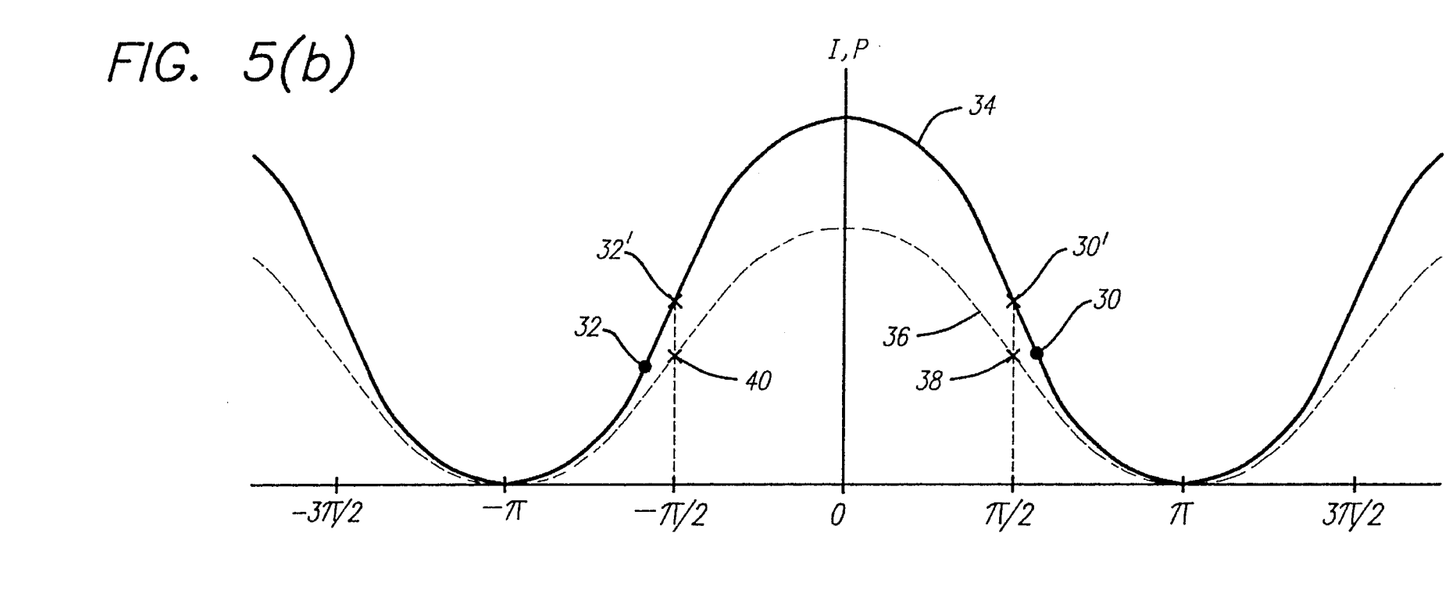

FIGS. 5(a) and 5(b) are a pair of graphs that illustrate the modulation, operating points and outputs of a fiber optic gyro modulated in accordance with the invention (square wave modulation). The foregoing are compared with the corresponding values for a lower power fiber optic gyro modulated in accordance with the prior art (corresponding prior art values indicated by dashed lines).

Referring to FIG. 5(a), one can see that the modulation waveform 28 comprises a square wave of period $2\tau$ with amplitude varying between the ranges of $\pi/2$ to $\pi$ and $-\pi$ to $-\pi/2$. (A sinusoidal waveform of identical period and amplitude x lying between the zero and maximum value arguments of $J_1(x)$, the first order Bessel function of the first kind, would be equally applicable.) The precise value of the modulation amplitude may be obtained by solving equation 5d for a minimum. However, the method of the invention is not addressed solely to attaining a minimum random walk value but rather to the improvement of random walk performance over that possible with prior art modulation schemes.

FIG. 5(b) is a graph of the intensity of the output of a fiber optic gyroscope as a function of $\Delta\phi$. As can be seen, the operating points 30, 32, corresponding to the n=0 in equation 6a describing square wave modulation in accordance with the invention, are located away from the $\pm\pi/2$ inflection points 30' and 32' of the output curve 34. The output intensity at such points is characterized by less-than-maximum sensitivity to a nonreciprocal perturbation $\epsilon$ indicative of a detected rotation rate. The lessened signal sensitivity will be partially compensated by increasing the power of the output curve 34 relative to that of a curve 36 (indicated by a dashed line) corresponding to a lower power source, such as a superluminescent diode. Although not essential, the substitution of a higher-power light source, when necessary, will overcome the effect of lessened sensitivity to a phase deviation for purposes of generating an electronic output. Further, as seen in FIG. 3, the relative benefit of the modulation scheme of the invention becomes more significant as peak power increases. By comparing the operating points 30, 32 of a gyro modulated in accordance with the invention with the operating points 38 and 40 of one subject to $\pm\pi/2$ square wave modulation, one may observe that, whereas the prior art modulation maximizes signal, the modulation scheme of the invention is directed to maximizing signal-to-noise ratio or, equivalently minimizing random walk.

Figure 6:
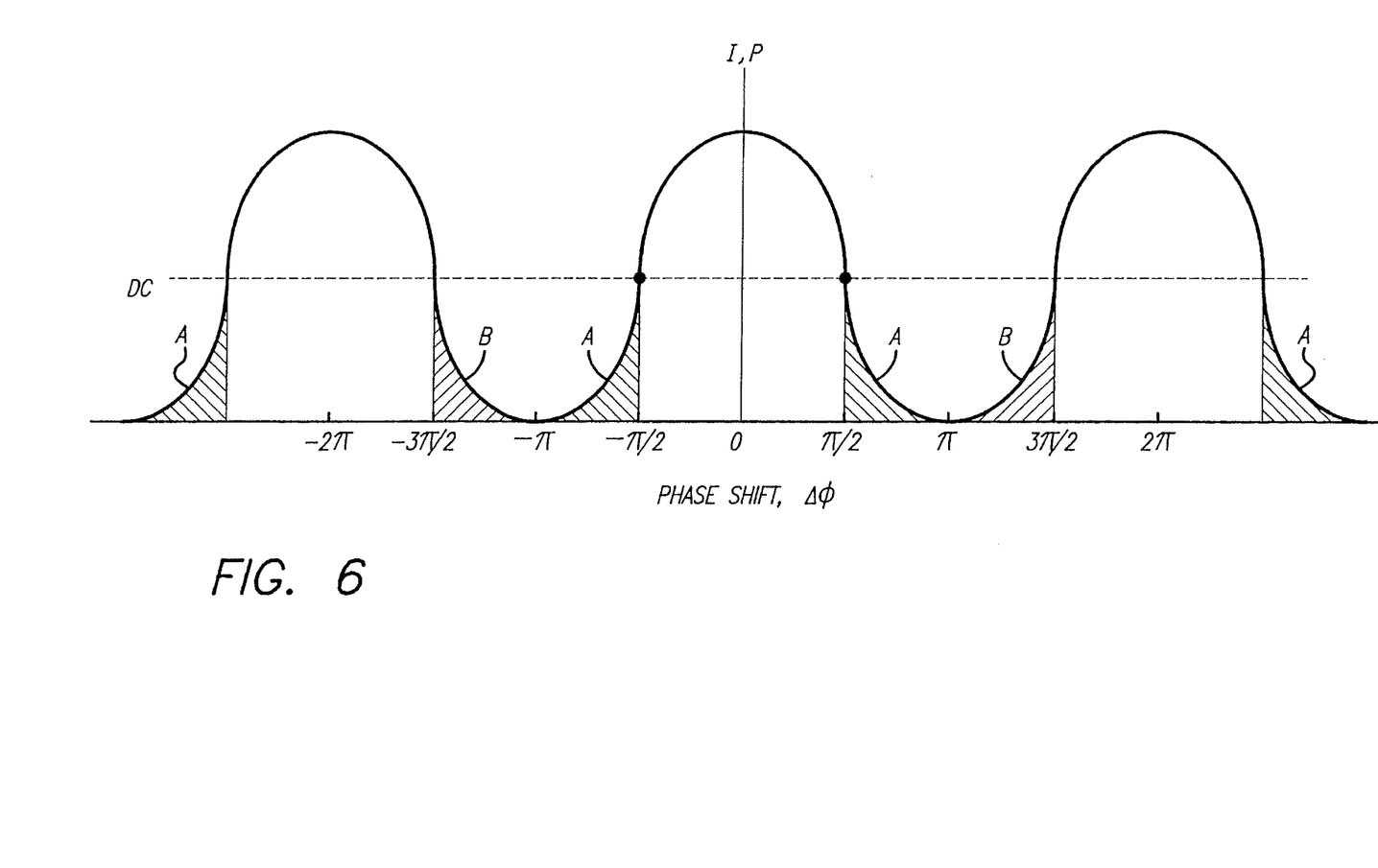
FIG. 6 is a graph of the output of a fiber optic gyroscope with areas indicated thereon corresponding to square wave modulation in accordance with the invention.

FIG. 6 is a graph of the output of a fiber optic gyro as a function of phase shift $\Delta\phi$. The areas is identified as "A" in this figure correspond to square wave modulation in accordance with the invention as defined in equation 6a while those identified as "B" correspond to square wave modulation in accordance with the invention as defined in equation 6b.

II. Sinusoidal Modulation in Accordance with the Invention

Sinusoidal modulation in accordance with the invention is defined by equation 6c. Square wave and sinusoidal modulations in accordance with the invention share the characteristic that each is arranged to operate upon the gyro output fringes at points other than those associated with generating a maximum output signal $\Delta I$ (or $\Delta P$) for a given nonreciprocal phase shift $\epsilon$. Differences between the maximum amplitudes of such prior art square wave and sinusoidal modulations (i.e., $\pi/2$ as opposed to about 1.8 radians) are related to the qualitatively-different durations of the transition periods between the maxima and minima of square waves and sinusoids. Thus Fourier-Bessel analysis, well known in the art, defines about $\pm 1.8$ radians as the sine wave maxima and minima for achieving a maximum gyro output for a given $\epsilon$ just as $\pm \pi/2$ defines the square wave maxima and minima for obtaining a maximum gyro output for a given $\epsilon$. The modulation defined by equation 6c, just as those defined by equations 6a and 6b, is directed to operation upon regions of the gyro output curve other than those associated with maximum signal output.

Thus it is seen that the present invention provides a method for modulating a fiber optic gyro that accomplishes a reduction in the white noise component of random walk beyond the limitations imposed by prior art modulation schemes. By reducing such error, one can significantly improve the accuracy of an inertial navigation system that employs fiber optic gyros to determine heading angle. The present invention requires no additional hardware to accomplish noise reduction and thus increases neither system complexity nor cost.

While this invention has been described with reference to its presently preferred embodiment, it is not limited thereto. Rather, this invention is limited only insofar as it is defined by the following set of patent claims and includes within its scope all equivalents thereof.

What is claimed is:

1. An improvement in a method for modulating a fiber optic gyroscope of the type that includes a sensor coil of optical fiber and in which the output of a light source is directed into said coil, then split into a pair of beams that are input into opposed ends of said coil to counterpropagate therein and said counterpropagating beams are combined to form a gyroscope output, said improvement comprising the steps of:
   a) selecting a periodic artificial phase shift such that the random walk of said output is less than that associated with maximum output signal modulation; and then
   b) applying said periodic artificial phase shift between said counterpropagating beams.

2. A method as defined in claim 1 wherein the step of selecting further comprises the steps of:
   a) selecting a square wave phase shift; and then
   b) selecting the amplitude of said square wave such that the average optical power of said gyro output is at less than a half power level.

3. A method as defined in claim 2 wherein said phase shift $\phi_M(t)$ where $(4n+1)\pi/2 [(4+1)\pi/2] < |\phi_M(t)| < (2n+1)\pi$, n being an integer including 0.

4. A method as defined in claim 2 wherein said phase shift is $\phi_M(t)$ where $(2n+1)\pi < |\phi_M(t)| < (4n+3)\pi/2$, n being an integer including 0.

5. A method as defined in claim 1 wherein said phase shift is a sinusoid $\phi_M(t)$ where $x < |\phi_M(t)| < y$ where x is such that $J_1(x)$ is a maximum, $J_1(y)=0$ and $J_1(\ )$ is a first order Bessel function of the first kind.

6. A method for modulating a fiber optic gyroscope of the type that includes a sensor coil of optical fiber, said method comprising the steps of:
   a) directing the output of a light source into said gyroscope; then
   b) splitting said light source output into a pair of beams; and
   c) inputting said beams into opposite ends of said coil whereby said beams counterpropagate therein; and
   d) applying a periodic artificial phase shift in the form of a square wave $\phi_M(t)$ between said counterpropagating beams where $(4n+1)\pi/2 < |\phi_M(t)| < (2n+1)\pi$, n being an integer including 0; and then
   e) combining said counterpropagating beams to form a gyroscope output.

7. A method as defined in claim 6 further including the step of adjusting the magnitude of said periodic phase shift to obtain a predetermined level of random walk of said gyroscope output.

8. A method as defined in claim 7 wherein the period of said periodic artificial phase shift is equal to twice the transit time of said sensor coil.

9. A method as defined in claim 6 wherein said light source comprises a rare earth doped optical fiber.

10. A method as defined in claim 8 wherein the magnitude of said periodic phase shift is selected to minimize the relative intensity noise component of gyro output random walk.

11. A method for modulating a fiber optic gyroscope of the type that includes a sensor coil of optical fiber, said method comprising the steps of:
   a) directing the output of a light source into said gyroscope; then
   b) splitting said light source output into a pair of beams; and
   c) inputting said beams into opposite ends of said coil whereby said beams counterpropagate therein; and
   d) applying a periodic artificial phase shift in the form of a square wave $\phi_M(t)$ between said counterpropagating beams where $(2n+1)\pi < |\phi_M(t)| < (4n+3)\pi/2$, n being an integer including 0; and then
   e) combining said counterpropagating beams to form a gyroscope output.

12. A method as defined in claim 11 further including the step of adjusting the magnitude of said periodic phase shift to obtain a predetermined level of random walk of said gyroscope output.

13. A method as defined in claim 12 wherein the period of said periodic artificial phase shift is equal to twice the transit time of said sensor coil.

14. A method as defined in claim 11 wherein said light source comprises a rare earth doped optical fiber.

15. A method as defined in claim 13 wherein the magnitude of said periodic phase shift is selected to minimize gyro output random walk.

16. A method for modulating a fiber optic gyroscope of the type that includes a sensor coil of optical fiber, said method comprising the steps of:

a) directing the output of a light source into said gyroscope; then b) splitting said light source output into a pair of beams; and c) inputting said beams into opposite ends of said coil whereby said beams counterpropagate therein; and d) applying a periodic artificial phase shift in the form of a sinusoid $\phi_M(t)$ between said counterpropagating beams where $x<|\phi_M(t)|< y$, where x is such that $J_1(x)$ is a maximum, $J_1(y)=0$ and $J_1(\ )$ is a first order Bessel function of the first kind; and then e) combining said counterpropagating beams to form a gyroscope output.

17. A method as defined in claim 16 further including the step of adjusting the magnitude of said periodic phase shift to obtain a predetermined level of random walk of said gyroscope output.

18. A method as defined in claim 17 wherein the period of said periodic artificial phase shift is equal to twice the transit time of said sensor coil.

19. A method as defined in claim 16 wherein said light source comprises a rare earth doped optical fiber.

20. A method as defined in claim 18 wherein the magnitude of said periodic phase shift is selected to minimize gyro output random walk.

21. A method for adjusting random walk noise in the output of a fiber optic gyroscope of the type in which a pair of light beams counterpropagates within a sensor coil of optical fiber, said method comprising the steps of:

a) applying a periodic artificial phase shift between said counterpropagating beams; and b) varying the magnitude of said periodic artificial phase shift whereby said random walk noise is responsively adjusted.

22. A method as defined in claim 21 further comprising the step of selecting said periodic artificial phase shift such that said random walk is less than that associated with maximum output signal modulation.

23. A method as defined in claim 22 wherein said selecting step further comprises the steps of:

a) selecting a square wave phase shift; and then b) selecting the amplitude of said square wave such that the average optical power of said gyro output is less than a half power level.

24. A method as defined in claim 23 wherein said phase shift is in the form of a square wave $\phi_M(t)$ where $(4n+1)\pi/2<|\phi_M(t)|<(2n+1)\pi$, n being an integer including 0.

25. A method as defined in claim 23 wherein said phase shift is in the form of a square wave $\phi_M(t)$ where $(2n+1)\pi<|\phi_M(t)|<(4n+3)\pi/2$, n being an integer including 0.

26. A method as defined in claim 22 wherein said phase shift is in the form of a sinusoid $\phi_M(t)$ where $x<|\phi_M(t)|<y$, where x is such that $J_1(x)=$maximum, $J_1(y)=0$ and $J_1(\ )$ is a first order Bessel function of the first kind.

* * * * *